(12) United States Patent
Selvam

(10) Patent No.: US 12,738,260 B2
(45) Date of Patent: Sep. 15, 2026

(54) GESTURE VOX

(71) Applicant: Harivatsan Selvam, Alpharetta, GA (US)

(72) Inventor: Harivatsan Selvam, Alpharetta, GA (US)

( * ) Notice: Subject to any disclaimer, the term of this patent is extended or adjusted under 35 U.S.C. 154(b) by 174 days.

(21) Appl. No.: 18/793,807

(22) Filed: Aug. 3, 2024

(65) Prior Publication Data

US 2026/0038478 A1 Feb. 5, 2026

(51) Int. Cl.
*G10L 15/26* (2006.01)
*G06V 40/20* (2022.01)
*G10L 13/027* (2013.01)

(52) U.S. Cl.
CPC ............ *G10L 13/027* (2013.01); *G06V 40/28* (2022.01)

(58) Field of Classification Search
None
See application file for complete search history.

(56) References Cited

U.S. PATENT DOCUMENTS 11,521,516 B2 * 12/2022 Johnson .................. G10L 13/00
11,741,755 B2 * 8/2023 Ko ...................... G06F 18/2413 382/100
11,854,308 B1 * 12/2023 Marsden .............. G06V 10/454
2009/0115721 A1 * 5/2009 Aull ...................... G06F 3/0425 348/E5.029
2019/0251702 A1 * 8/2019 Chandler ............... G06V 40/28
2020/0005028 A1 * 1/2020 Gu ......................... G10L 13/00
2021/0279453 A1 * 9/2021 Luqman .............. G06F 18/2431
2022/0188538 A1 * 6/2022 Vieira Rocha .......... G06F 40/10
2023/0085161 A1 * 3/2023 Rahmani .............. G09B 21/009 704/235
2025/0292191 A1 * 9/2025 Shankar ............... G06Q 10/083
2025/0350584 A1 * 11/2025 Hadad ..................... G06F 21/53
2026/0080802 A1 * 3/2026 Jadhav ................. G09B 21/009

* cited by examiner

*Primary Examiner* — Neeraj Sharma

(57) ABSTRACT

GestureVox is an innovative AI-powered software system designed to convert sign language into spoken words in real-time. Utilizing advanced machine learning techniques, including frameworks such as TensorFlow, PyTorch, Keras, and Scikit-learn, GestureVox offers a seamless and accurate gesture recognition and speech synthesis process. The system's architecture includes modules for data collection, pre-processing, model training, testing, hyperparameter tuning, and deployment. Key features include the ability to process live video feeds, a user-friendly interface, and scalability to handle a large number of concurrent users, potentially utilizing cloud services such as AWS, Azure, and Google Cloud. GestureVox significantly enhances communication for individuals with speech impairments, providing an inclusive and accessible solution.

4 Claims, 5 Drawing Sheets

GESTURE VOX

BACKGROUND OF THE INVENTION

This invention pertains to computer science, focusing on machine learning and software systems for gesture recognition and speech synthesis. Specifically, it relates to a software system that converts sign language into spoken words in real-time. Effective communication is essential, yet millions worldwide face barriers due to speech impairments. According to Statistics, approximately 300 million individuals globally are affected by hearing and speech impairments. These individuals often rely on sign language, which creates a communication gap with those who do not understand it, leading to social isolation and limited opportunities for interaction in various social, educational, and professional settings. Current systems are not user-friendly for people with impairments and do not offer specialized services tailored to their needs. Many existing solutions lack the necessary accuracy, speed, and comprehensiveness required to be effective communication tools. This invention seeks to overcome these limitations by providing an AI-powered software system, GestureVox, which offers seamless, real-time conversion of sign language into spoken words. GestureVox ensures accurate, fast, and comprehensive communication support for users, making interactions more inclusive and accessible.

SUMMARY OF THE INVENTION

GestureVox is an AI-powered software system that converts sign language into spoken words in real-time, addressing communication barriers for individuals with speech impairments. By leveraging advanced machine learning algorithms and gesture recognition technology, GestureVox ensures accurate and rapid conversion of gestures into natural-sounding speech.

The primary objective of GestureVox is to bridge the communication gap between the deaf and hearing communities, making interactions more inclusive and accessible. GestureVox is user-friendly and versatile, suitable for educational settings, workplaces, and daily interactions. It aims to overcome the limitations of current systems by providing a reliable, efficient, and comprehensive communication tool, improving the quality of life for individuals with speech impairments.

BRIEF DESCRIPTION FOR DRAWINGS

Figure 1:
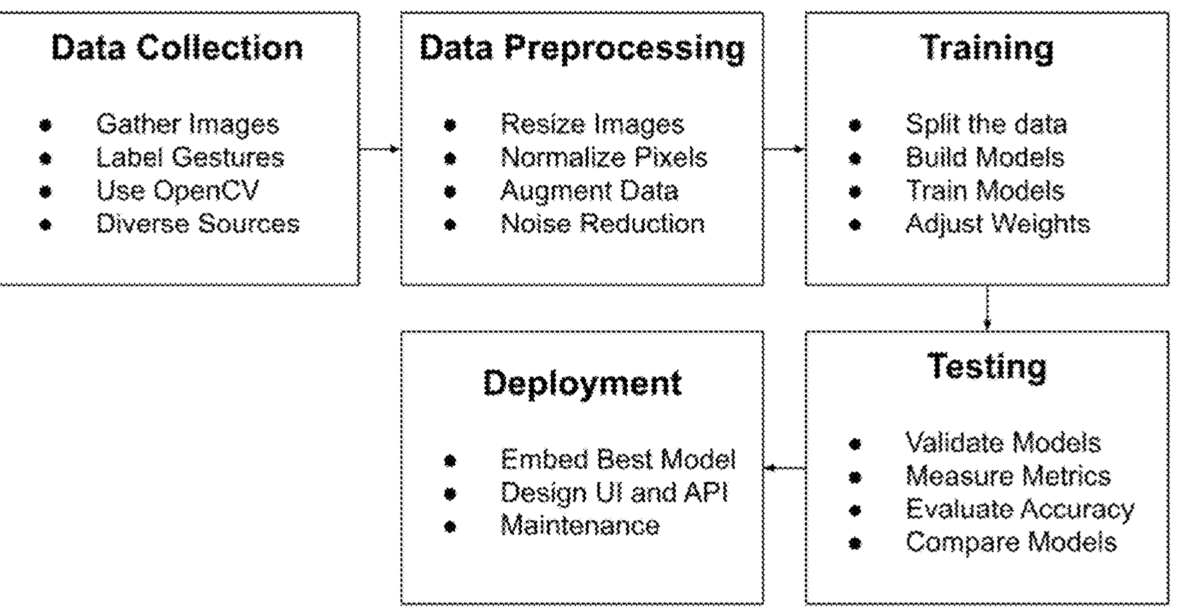

FIG. 1: System Overview of GestureVox

Description: A flowchart providing a high-level overview of the GestureVox system, illustrating its main components and their interactions from data collection to deployment.

Figure 2:
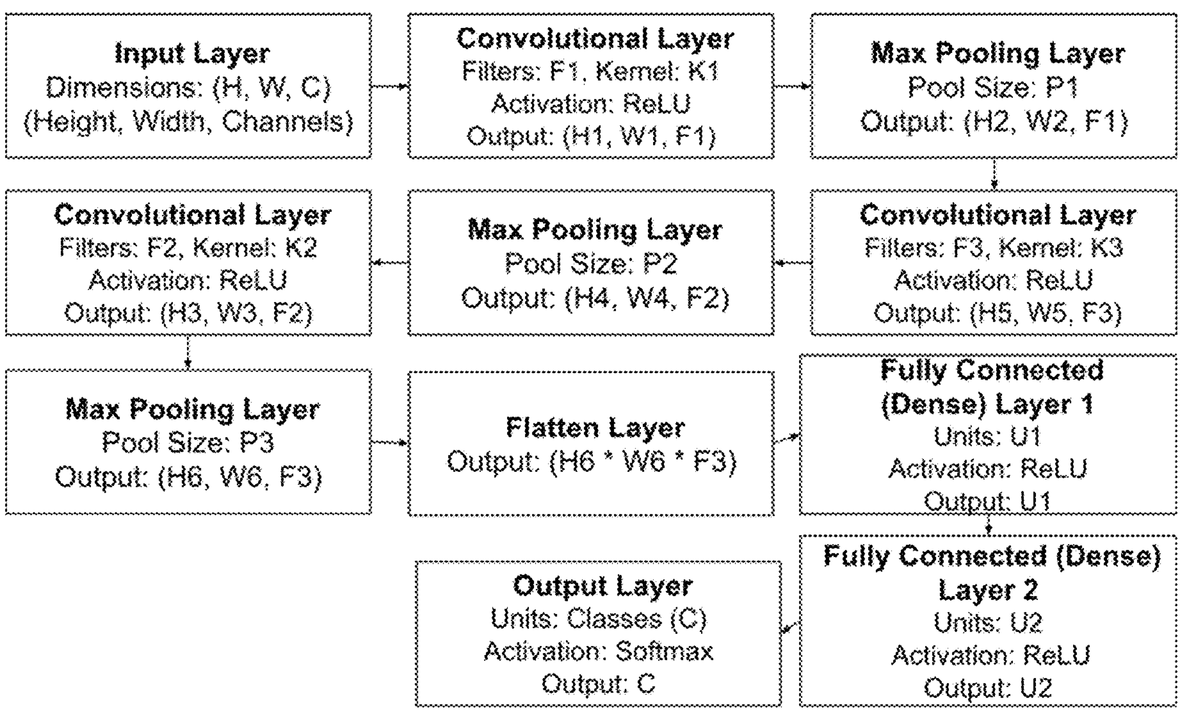

FIG. 2: Neural Network Architecture

Description: A flowchart explaining the neural network architecture, detailing the layers and processes involved in transforming input images into gesture classifications.

Figure 3:
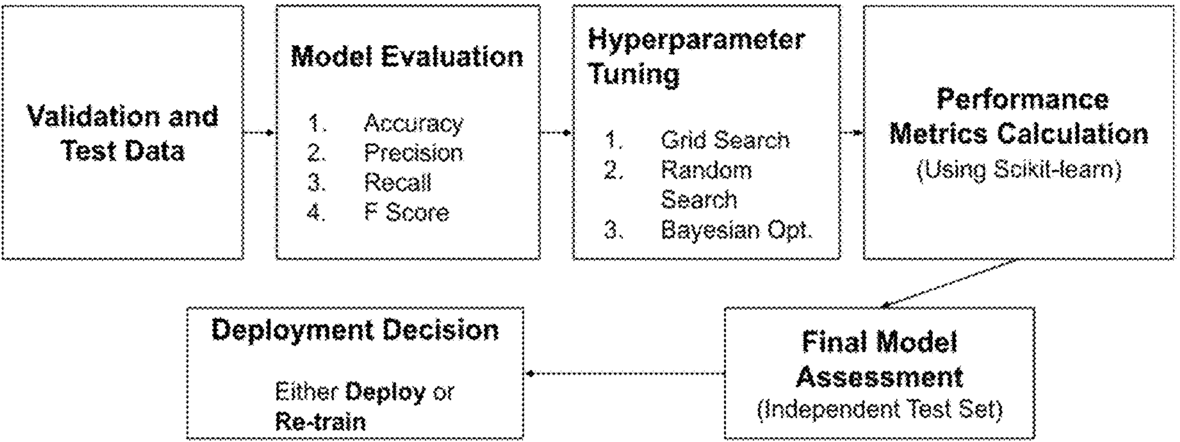

FIG. 3: Evaluation, Testing, and Validation Process

Description: A flowchart detailing the evaluation, testing, and validation process, including performance metric calculations and hyperparameter tuning.

Figure 4:
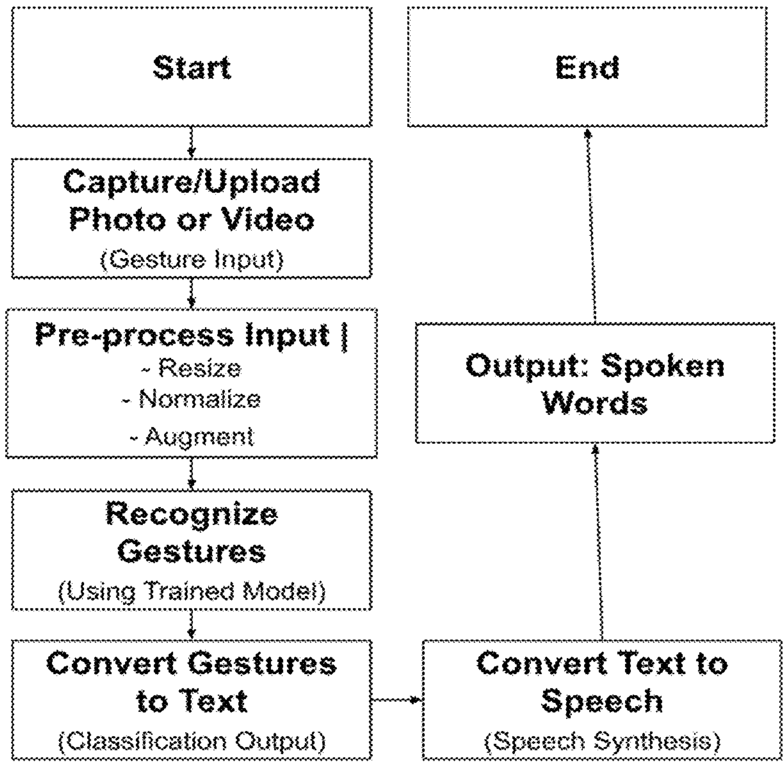

FIG. 4: Overall Functioning of the Software

Description: A flowchart explaining the overall functioning of GestureVox, from user input through gesture recognition to speech synthesis and delivery.

Figure 5:
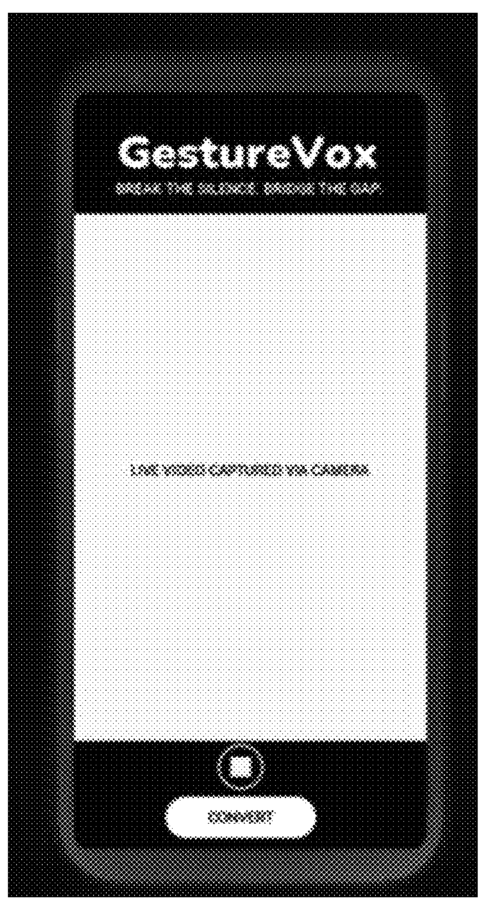

FIG. 5: Sample User Interface of the App

Description: A sample design of the GestureVox user interface, illustrating how users interact with the application for gesture input and speech output.

DETAILED DESCRIPTION OF THE INVENTION

The present invention relates to an advanced AI-powered software system designed to convert sign language into spoken words in real-time. The system is composed of several key modules: Data Collection, Pre-Processing, Training, Testing, and Deployment. Each module is crucial for ensuring the software's effectiveness and reliability.

The data collection module gathers a comprehensive dataset of images representing common gestures used in sign language. Data is collected from diverse sources to ensure variability, including video recordings of sign language interpreters, crowdsourced images from volunteers fluent in sign language, and publicly available datasets. Each image is meticulously labeled with the corresponding gesture to facilitate supervised learning. Tools such as Python scripts and the OpenCV library are used to capture and label the images, ensuring that the dataset is comprehensive and varied. This comprehensive data collection process ensures that the model is trained on a diverse set of gestures, enhancing its ability to generalize to new, unseen gestures.

Once collected, the data undergoes a series of pre-processing steps to enhance the quality and consistency of the input images. The pre-processing module performs several tasks to standardize the images, including resizing all images to a uniform size suitable for model input, normalizing pixel values to a standard range to improve model convergence, and applying augmentation techniques such as rotation, flipping, and scaling to artificially expand the dataset and improve model generalization. Additionally, noise reduction techniques are employed to remove any background noise or irrelevant details, ensuring that the focus remains on the gesture itself. Libraries like TensorFlow and Keras, along with Python's NumPy and Pandas for data manipulation, are utilized in this module. These preprocessing steps are crucial for ensuring that the images fed into the machine learning models are clean and standardized, which is essential for effective training.

The core of GestureVox's functionality lies in its machine learning model, which is trained to recognize and interpret sign language gestures. The training module involves selecting an appropriate deep learning architecture, such as convolutional neural networks (CNNs), for image recognition tasks. Frameworks like TensorFlow, PyTorch, and Scikit-learn are used for building and training the models. The dataset is divided into training, validation, and test sets to evaluate the model's performance and avoid overfitting.

The neural network for GestureVox is designed to recognize gestures in images through a series of steps. First, the input layer receives the raw image data, maintaining its height, width, and color channels. Convolutional layers then apply filters to the image, creating feature maps that detect edges, textures, and other patterns. These layers use activation functions like ReLU to help the network learn complex features. Next, pooling layers, usually max pooling, reduces the size of the feature maps by selecting the most important values, which helps the network focus on significant features and reduces the amount of data to process. After this, the network flattens the feature maps into a single, one-dimensional vector. This flattened data is passed to fully connected layers, where every neuron is connected to every neuron in the previous layer. These layers combine the learned features to make sense of the patterns and classify the gestures. The final layer uses a softmax activation function to output probabilities for each gesture class. The class with the highest probability is chosen as the predicted gesture. This step-by-step process is intended to enable the neural network to efficiently learn and recognize patterns in images, making it effective for real-time gesture recognition.

During the training process, the pre-processed images are fed into the model, which adjusts its weights based on the error rate, iterating through multiple epochs to optimize performance. The cross-entropy loss function measures the model's accuracy and guides the optimization process, while optimization algorithms like Adam and Stochastic Gradient Descent (SGD) minimize the loss function. This rigorous training process ensures that the model learns to accurately recognize gestures from a wide range of inputs.

After training, the model is rigorously tested to evaluate its accuracy and reliability. The testing module involves assessing the model on the validation set to fine-tune hyperparameters and improve performance, and measuring the final accuracy on an independent test set to ensure robustness and generalizability. Performance metrics such as accuracy, precision, recall, and F1-score are calculated to quantify the model's effectiveness. Python libraries like Scikit-learn are employed for these evaluations. This thorough testing process ensures that the model performs well across a variety of test cases and is robust to different input conditions.

Hyperparameter tuning is critical for optimizing the model's performance. This module involves identifying key hyperparameters such as learning rate, batch size, and number of layers, and applying techniques like grid search, random search, or Bayesian optimization to find the best combination of hyperparameters. Cross-validation is used to validate the effectiveness of the selected hyperparameters and avoid overfitting. Tools like Scikit-learn and Optuna are utilized for hyperparameter tuning. This process ensures that the model operates at its highest possible performance, making it as accurate and reliable as possible.

Multiple models are built and tested during the development process. Their performance is compared based on the results obtained from the testing module. The model with the highest accuracy and best overall performance metrics is selected for deployment. This comparison ensures that GestureVox uses the most effective model for real-time gesture recognition and speech synthesis.

Once the best model is selected, it is deployed for real-time use. The deployment module encompasses embedding the trained model into the GestureVox software application, ensuring the system can process live video feeds and convert gestures to speech in real-time, and designing an intuitive interface that allows users to interact with the software easily. The system is designed to handle a large number of concurrent users and scale efficiently, with continuous monitoring to maintain high accuracy and reliability. Deployment frameworks such as TensorFlow Serving, Flask for the API, and Docker for containerization are used to ensure scalability and ease of deployment.

The user interface is developed using web technologies like HTML, CSS, and JavaScript, possibly utilizing front-end frameworks like React or Angular for a more dynamic experience. This deployment process ensures that the system is powerful, scalable, and user-friendly.

To use GestureVox, users need to install the software application on their device. Upon launching the application, the user interface guides them through the setup process, including camera calibration and initial gesture recognition tests. Once set up, users can perform sign language gestures in front of the camera, and the software processes these gestures in real-time, converting them into spoken words. This seamless interaction allows individuals with speech impairments to communicate effectively with those who do not understand sign language.

GestureVox leverages advanced AI and machine learning techniques to provide a seamless, real-time conversion of sign language into spoken words. By meticulously developing each module from data collection to deployment, GestureVox ensures an accurate and user-friendly solution that bridges the communication gap between the deaf and hearing communities.

GestureVox is designed with flexibility and scalability to evolve in order to improve its accuracy, user experience, and overall power. This description outlines the intended functionality and structure, while accommodating future changes and advancements. Various libraries and frameworks such as TensorFlow, PyTorch, Scikit-learn, Keras, and OpenCV can be employed. Additional tools and services like AWS SageMaker, Google Cloud AI Platform, and Microsoft Azure Machine Learning can be used for model training, testing, and deployment. This strategic approach ensures adaptability while securing patent protection for the core concepts and innovations of GestureVox.

The invention claimed is:

1. A computer system for converting sign language gestures into spoken audio output in real time, the computer system comprising:

one or more processors; and one or more non-transitory computer-readable memories storing instructions that, when executed by the one or more processors, cause the computer system to perform a model-deployment preparation stage followed by a calibration-gated live inference stage, wherein the model-deployment preparation stage comprises:

generating pre-processed training gesture image data from labeled sign-language gesture images by resizing the labeled sign-language gesture images to a uniform model-input size, normalizing pixel values of the labeled sign-language gesture images to a model-input range, applying noise-reduction processing to reduce background noise or non-gesture image information, and augmenting the labeled sign-language gesture images using at least one of rotation, flipping, or scaling;

dividing the pre-processed training gesture image data into a training set, a validation set, and an independent test set;

training a plurality of candidate convolutional neural-network models using the training set;

evaluating the plurality of candidate convolutional neural-network models using the validation set;

measuring a final accuracy of each of the plurality of candidate convolutional neural-network models using the independent test set;

calculating precision, recall, and F1-score for each of the plurality of candidate convolutional neural-network models;

selecting, after the precision, recall, and F1-score have been calculated, a candidate convolutional neural-network model having a highest final accuracy on the independent test set among the plurality of candidate convolutional neural-network models; and embedding the selected candidate convolutional neural-network model into a software application as a deployed convolutional neural network configured for real-time gesture-to-speech conversion;

wherein the calibration-gated live inference stage comprises:

guiding a user, through a user interface of the software application, through a setup sequence comprising camera calibration and an initial gesture-recognition test;

only after completion of the setup sequence, receiving, from a camera input calibrated during the setup sequence, a live video feed comprising sequential image frames of the user performing sign language gestures;

generating standardized live gesture image data from the sequential image frames by resizing the sequential image frames to the uniform model-input size, normalizing pixel values of the sequential image frames to the model-input range, and applying noise-reduction processing to reduce background noise or non-gesture image information before the standardized live gesture image data is provided to the deployed convolutional neural network;

processing the standardized live gesture image data using the deployed convolutional neural network, wherein the deployed convolutional neural network comprises:

an input layer configured to receive the standardized live gesture image data while preserving height, width, and color-channel information;

one or more convolutional layers configured to apply convolutional filters to the standardized live gesture image data to generate feature maps representing gesture-related edges, textures, or image patterns;

one or more rectified linear unit activation functions configured to introduce non-linearity into the feature maps;

one or more pooling layers configured to reduce dimensionality of the feature maps;

a flattening operation configured to convert the reduced-dimensionality feature maps into a one-dimensional vector;

one or more fully connected layers configured to classify the one-dimensional vector into a plurality of predefined sign-language gesture classes;

a softmax output layer configured to generate a probability value for each of the plurality of predefined sign-language gesture classes;

selecting, as a predicted sign-language gesture, one of the plurality of predefined sign-language gesture classes having a highest probability value generated by the softmax output layer; and generating spoken audio output corresponding to the predicted sign-language gesture.

2. The computer system of claim 1, wherein the setup sequence of the calibration-gated live inference stage comprises:

displaying, through the user interface of the software application, a setup prompt instructing the user to perform one or more sign language gestures within a field of view of the camera input;

capturing, from the camera input during the setup sequence and before receiving the live video feed for real-time gesture-to-speech conversion, one or more test image frames corresponding to the one or more sign language gestures;

generating standardized setup-test gesture image data from the one or more test image frames by resizing the one or more test image frames to the uniform model-input size, normalizing pixel values of the one or more test image frames to the model-input range, and applying noise-reduction processing to reduce background noise or non-gesture image information;

providing the standardized setup-test gesture image data to the input layer of the deployed convolutional neural network during the setup sequence;

generating, using the softmax output layer of the deployed convolutional neural network during the setup sequence, one or more test probability values for the initial gesture-recognition test, the one or more test probability values corresponding to the plurality of predefined sign-language gesture classes; and receiving the live video feed for real-time gesture-to-speech conversion after the deployed convolutional neural network generates the one or more test probability values during the setup sequence.

3. The computer system of claim 2, wherein the preprocessed training gesture image data, the standardized setup-test gesture image data, and the standardized live gesture image data are generated according to a common gesture-image input-conformity protocol that imposes the uniform model-input size, the model-input range, and the noise-reduction processing across the model-deployment preparation stage, the setup sequence, and the calibration-gated live inference stage, and wherein the deployed convolutional neural network receives both the standardized setup-test gesture image data and the standardized live gesture image data through the input layer while preserving height, width, and color-channel information.

4. The computer system of claim 3, wherein, during the calibration-gated live inference stage, the deployed convolutional neural network operates as an embedded inference model within the software application after completion of the model-deployment preparation stage, and wherein real-time gesture-to-speech conversion of the live video feed is performed through a runtime inference path comprising:

generating the standardized live gesture image data according to the common gesture-image input-conformity protocol;

providing the standardized live gesture image data to the input layer of the deployed convolutional neural network;

processing the standardized live gesture image data through the one or more convolutional layers, the one or more rectified linear unit activation functions, the one or more pooling layers, the flattening operation, and the one or more fully connected layers of the deployed convolutional neural network;

generating, by the softmax output layer, probability values corresponding to the plurality of predefined sign-language gesture classes;

selecting the predicted sign-language gesture as the predefined sign-language gesture class having the highest probability value; and generating the spoken audio output corresponding to the predicted sign-language gesture, wherein the runtime inference path is performed using the deployed convolutional neural network embedded in the software application without performing training, validation-set evaluation, independent-test-set measurement, or candidate-model selection among the plurality of candidate convolutional neural-network models during receipt of the live video feed.

* * * * *